United States Patent
Hefetz

(10) Patent No.: US 11,354,667 B2
(45) Date of Patent: *Jun. 7, 2022

(54) METHOD FOR INTERNET USER AUTHENTICATION

(71) Applicant: SPRIV LLC, Boca Raton, FL (US)

(72) Inventor: Guy Hefetz, Boca Raton, FL (US)

(73) Assignee: SPRIV LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/149,776

(22) Filed: Jan. 15, 2021

(65) Prior Publication Data

US 2021/0133749 A1 May 6, 2021

Related U.S. Application Data

(63) Continuation-in-part of application No. 16/724,361, filed on Dec. 22, 2019, which is a
(Continued)

(51) Int. Cl.
*G06K 5/00* (2006.01)
*G06Q 20/40* (2012.01)
(Continued)

(52) U.S. Cl.
CPC ..... *G06Q 20/4015* (2020.05); *G06Q 20/3226* (2013.01); *G06Q 20/3227* (2013.01);
(Continued)

(58) Field of Classification Search
CPC ..... G06Q 20/20; G07G 1/0036; G07G 1/0081
(Continued)

(56) References Cited

U.S. PATENT DOCUMENTS

| 5,327,144 A | 7/1994 | Stilp et al. |
| 5,754,657 A | 5/1998 | Schipper et al. |

(Continued)

FOREIGN PATENT DOCUMENTS

| EP | 1459365 A2 | 9/2004 |
| EP | 1469368 A1 | 10/2004 |

(Continued)

OTHER PUBLICATIONS

Sharma, Seema, "Location based authentication" M.S. Thesis, University of New Orleans, May 20, 2005. https://scholarworks.uno.edu/td/141/.

(Continued)

*Primary Examiner* — Daniel St Cyr
(74) *Attorney, Agent, or Firm* — James P. Demers; Cittone Demers & Arneri LLP

(57) ABSTRACT

A computer-implemented method of authenticating the identity of a user is provided, where the user is associated with a computer signature and is in possession of a mobile phone. The method involves obtaining a current geographical location of the mobile phone, determining if the computer signature is associated in a database with a stored geographical location of the phone, and, if the computer signature is associated in the database with a stored geographical location, comparing the stored geographical location to the current geographical location of the phone.

18 Claims, 1 Drawing Sheet

Related U.S. Application Data continuation-in-part of application No. 15/787,805, filed on Oct. 19, 2017, now Pat. No. 10,521,786, which is a continuation-in-part of application No. 15/606,270, filed on May 26, 2017, now Pat. No. 10,289,833, which is a continuation-in-part of application No. 15/134,545, filed on Apr. 21, 2016, now Pat. No. 9,727,867, which is a continuation-in-part of application No. 14/835,707, filed on Aug. 25, 2015, now Pat. No. 9,391,985, which is a continuation-in-part of application No. 14/479,266, filed on Sep. 5, 2014, now abandoned, which is a continuation-in-part of application No. 14/145,862, filed on Dec. 31, 2013, now Pat. No. 9,033,225, which is a continuation-in-part of application No. 13/479,235, filed on May 23, 2012, now Pat. No. 8,770,477, which is a continuation-in-part of application No. 13/065,691, filed on Mar. 28, 2011, now Pat. No. 8,640,197, which is a continuation-in-part of application No. 12/600,808, filed as application No. PCT/US2007/012552 on May 29, 2007, now Pat. No. 8,370,909.

(51) Int. Cl.
  *G06Q 20/32* (2012.01)
  *H04L 9/40* (2022.01)

(52) U.S. Cl.
  CPC ...... *H04L 63/0876* (2013.01); *H04L 63/0892* (2013.01); *G06Q 20/4016* (2013.01)

(58) Field of Classification Search
  USPC ...... 235/382, 380, 383; 726/2–5; 705/64, 67
  See application file for complete search history.

(56) References Cited

U.S. PATENT DOCUMENTS

| | | | |
|---|---|---|---|
| 5,757,916 | A | 5/1998 | MacDoran et al. |
| 5,790,074 | A | 8/1998 | Rangedahl et al. |
| 5,945,944 | A | 8/1999 | Krasner |
| 6,012,144 | A | 1/2000 | Pickett |
| 6,097,938 | A | 8/2000 | Paxson |
| 6,236,365 | B1 | 5/2001 | LeBlanc et al. |
| 6,466,779 | B1 | 10/2002 | Moles et al. |
| 6,612,488 | B2 * | 9/2003 | Suzuki ............ G06Q 20/40 235/380 |
| 6,625,456 | B1 | 9/2003 | Busso et al. |
| 6,882,313 | B1 | 4/2005 | Fan et al. |
| 6,975,941 | B1 * | 12/2005 | Lau ............ G01C 21/3415 701/491 |
| 6,978,023 | B2 | 12/2005 | Dacosta |
| 7,013,149 | B2 | 3/2006 | Vetro et al. |
| 7,080,402 | B2 | 7/2006 | Bates |
| 7,212,806 | B2 | 5/2007 | Karaoguz |
| 7,305,245 | B2 | 12/2007 | Alizadeh-Shabdiz et al. |
| 7,321,775 | B2 | 1/2008 | Maanoja |
| 7,376,431 | B2 | 5/2008 | Niedermeyer |
| 7,418,267 | B2 | 8/2008 | Karaoguz |
| 7,450,930 | B2 | 11/2008 | Williams et al. |
| 7,497,374 | B2 | 3/2009 | Helsper |
| 7,503,489 | B2 | 3/2009 | Heffez et al. |
| 7,577,665 | B2 | 8/2009 | Ramer et al. |
| 7,591,020 | B2 | 9/2009 | Kammer et al. |
| 7,594,605 | B2 | 9/2009 | Aaron et al. |
| 7,598,855 | B2 | 10/2009 | Scalisi et al. |
| 7,647,164 | B2 | 1/2010 | Reevs |
| 7,669,759 | B1 | 3/2010 | Zettner |
| 7,673,032 | B1 | 3/2010 | Augart |
| 7,673,793 | B2 | 3/2010 | Greene |
| 7,751,829 | B2 | 7/2010 | Masuoka et al. |
| 7,764,231 | B1 | 7/2010 | Karr et al. |
| 7,769,396 | B2 | 8/2010 | Alizadeh-Shabdiz et al. |
| 7,788,134 | B1 | 8/2010 | Manber et al. |
| 7,832,636 | B2 | 11/2010 | Heffez et al. |
| 7,848,760 | B2 | 12/2010 | Caspi et al. |
| 7,865,181 | B1 | 1/2011 | Macaluso |
| 7,907,529 | B2 | 3/2011 | Wisely et al. |
| 7,908,645 | B2 | 3/2011 | Varghese et al. |
| 8,006,190 | B2 | 8/2011 | Quoc et al. |
| 8,285,639 | B2 | 10/2012 | Eden et al. |
| 8,295,898 | B2 | 10/2012 | Ashfield et al. |
| 8,321,913 | B2 | 11/2012 | Turnbull |
| 8,370,909 | B2 | 2/2013 | Heffez |
| 8,374,634 | B2 | 2/2013 | Dankar et al. |
| 8,572,391 | B2 | 10/2013 | Golan et al. |
| 8,606,299 | B2 | 12/2013 | Fok et al. |
| 8,611,919 | B2 | 12/2013 | Barnes, Jr. |
| 8,640,197 | B2 | 1/2014 | Heffez |
| 8,668,568 | B2 | 3/2014 | Denker et al. |
| 8,676,684 | B2 | 3/2014 | Newman et al. |
| 8,770,477 | B2 | 7/2014 | Hefetz |
| 8,793,776 | B1 | 7/2014 | Jackson |
| 8,904,496 | B1 | 12/2014 | Bailey et al. |
| 9,014,666 | B2 | 4/2015 | Bentley et al. |
| 9,033,225 | B2 | 5/2015 | Hefetz |
| 9,391,985 | B2 | 7/2016 | Hefetz |
| 9,727,867 | B2 | 8/2017 | Heffez et al. |
| 10,289,833 | B2 | 5/2019 | Hefetz |
| 10,521,786 | B2 | 12/2019 | Hefetz |
| 10,552,583 | B2 | 2/2020 | Piccionelli et al. |
| 10,554,645 | B2 | 2/2020 | Hefetz |
| 10,645,072 | B2 | 5/2020 | Heffez et al. |
| 2001/0034718 | A1 | 10/2001 | Shaked et al. |
| 2002/0016831 | A1 * | 2/2002 | Peled ............ H04L 61/1511 709/219 |
| 2002/0019699 | A1 | 2/2002 | McCarty et al. |
| 2002/0035622 | A1 | 3/2002 | Barber |
| 2002/0053018 | A1 | 5/2002 | Ota et al. |
| 2002/0073044 | A1 | 6/2002 | Singhal |
| 2002/0089960 | A1 | 7/2002 | Shuster |
| 2002/0188712 | A1 | 12/2002 | Caslin et al. |
| 2003/0009594 | A1 * | 1/2003 | McElligott ............ H04L 41/00 709/245 |
| 2003/0056096 | A1 | 3/2003 | Albert et al. |
| 2003/0061163 | A1 | 3/2003 | Durfield |
| 2003/0101134 | A1 | 5/2003 | Liu et al. |
| 2003/0134648 | A1 | 7/2003 | Reed et al. |
| 2003/0135463 | A1 | 7/2003 | Brown et al. |
| 2003/0144952 | A1 | 7/2003 | Brown et al. |
| 2003/0187800 | A1 | 10/2003 | Moore et al. |
| 2003/0190921 | A1 | 10/2003 | Stewart |
| 2004/0073519 | A1 | 4/2004 | Fast |
| 2004/0081109 | A1 | 4/2004 | Oishi |
| 2004/0088551 | A1 | 5/2004 | Dor et al. |
| 2004/0111640 | A1 | 6/2004 | Baum |
| 2004/0219904 | A1 * | 11/2004 | De Petris ............ G06Q 20/3224 455/410 |
| 2004/0234117 | A1 | 11/2004 | Tibor |
| 2004/0242201 | A1 | 12/2004 | Sasakura et al. |
| 2004/0254868 | A1 | 12/2004 | Kirkland et al. |
| 2004/0259572 | A1 * | 12/2004 | Aoki ............ H04L 67/306 455/456.2 |
| 2005/0021738 | A1 * | 1/2005 | Goeller ............ H04L 69/161 709/224 |
| 2005/0022119 | A1 * | 1/2005 | Kraemer ............ G06Q 30/06 715/234 |
| 2005/0027543 | A1 | 2/2005 | Yannis |
| 2005/0027667 | A1 | 2/2005 | Kroll |
| 2005/0065875 | A1 | 3/2005 | Beard |
| 2005/0066179 | A1 | 3/2005 | Seidlein |
| 2005/0075985 | A1 | 4/2005 | Cartmell |
| 2005/0086164 | A1 | 4/2005 | Kim et al. |
| 2005/0143916 | A1 | 6/2005 | Kim et al. |
| 2005/0159173 | A1 | 7/2005 | Dowling |
| 2005/0160280 | A1 | 7/2005 | Caslin et al. |
| 2005/0180395 | A1 | 8/2005 | Moore et al. |
| 2005/0198218 | A1 | 9/2005 | Tasker et al. |
| 2006/0031830 | A1 | 2/2006 | Chu et al. |
| 2006/0064374 | A1 | 3/2006 | Helsper et al. |
| 2006/0085310 | A1 | 4/2006 | Mylet et al. |
| 2006/0085357 | A1 | 4/2006 | Pizarro |

(56) References Cited

U.S. PATENT DOCUMENTS

| | | |
|---|---|---|
| 2006/0107307 A1 | 5/2006 | Knox et al. |
| 2006/0128397 A1 | 6/2006 | Choti et al. |
| 2006/0194592 A1 | 8/2006 | Clough |
| 2006/0217131 A1 | 9/2006 | Farshid et al. |
| 2006/0277312 A1 | 12/2006 | Hirsch |
| 2007/0053306 A1 | 3/2007 | Stevens |
| 2007/0055672 A1 | 3/2007 | Stevens |
| 2007/0055684 A1 | 3/2007 | Stevens |
| 2007/0055732 A1 | 3/2007 | Stevens |
| 2007/0055785 A1 | 3/2007 | Stevens |
| 2007/0061301 A1 | 3/2007 | Ramer et al. |
| 2007/0084913 A1 | 4/2007 | Weston |
| 2007/0133487 A1 | 6/2007 | Wang et al. |
| 2007/0136573 A1 | 6/2007 | Steinberg |
| 2008/0046367 A1 | 2/2008 | Billmaier et al. |
| 2008/0046988 A1 | 2/2008 | Baharis et al. |
| 2008/0146193 A1 | 5/2008 | Bentley et al. |
| 2008/0132170 A1 | 6/2008 | Farshid et al. |
| 2008/0189776 A1 | 8/2008 | Constable |
| 2008/0222038 A1 | 9/2008 | Eden et al. |
| 2008/0248892 A1 | 10/2008 | Walworth |
| 2008/0249939 A1 | 10/2008 | Veenstra |
| 2009/0260075 A1 | 10/2009 | Gedge et al. |
| 2009/0276321 A1 | 11/2009 | Krikorian et al. |
| 2010/0051684 A1 | 3/2010 | Powers |
| 2013/0091544 A1 | 4/2013 | Oberheide et al. |
| 2013/0104198 A1 | 4/2013 | Grim |
| 2013/0197998 A1 | 8/2013 | Buhrmann et al. |
| 2013/0312078 A1 | 11/2013 | Oberheide et al. |
| 2014/0068723 A1 | 3/2014 | Grim et al. |
| 2014/0245379 A1 | 8/2014 | Oberheide et al. |
| 2014/0245389 A1 | 8/2014 | Oberheide et al. |
| 2014/0245450 A1 | 8/2014 | Oberheide et al. |
| 2015/0040190 A1 | 2/2015 | Oberheide et al. |
| 2015/0046989 A1 | 2/2015 | Oberheide et al. |
| 2015/0046990 A1 | 2/2015 | Oberheide et al. |
| 2015/0074408 A1 | 3/2015 | Oberheide et al. |
| 2015/0074644 A1 | 3/2015 | Oberheide et al. |
| 2015/0161378 A1 | 6/2015 | Oberheide et al. |

FOREIGN PATENT DOCUMENTS

| | | |
|---|---|---|
| EP | 1696626 A1 | 8/2006 |
| EP | 1708527 A1 | 10/2006 |
| EP | 1875653 A2 | 1/2008 |
| GB | 2383497 B1 | 6/2003 |
| GB | 2402792 A | 12/2004 |
| KR | 1020030043886 A | 6/2003 |
| WO | WO2000075760 A1 | 12/2000 |
| WO | WO2001028272 A1 | 4/2001 |
| WO | WO2001054091 A2 | 7/2001 |
| WO | WO2002093502 A1 | 11/2002 |
| WO | WO2004/079499 A2 | 9/2004 |
| WO | WO04095857 A1 | 11/2004 |
| WO | 2005071988 A1 | 8/2005 |
| WO | WO2007004224 A1 | 1/2007 |

OTHER PUBLICATIONS

Lenders, V. et al., "Location-based Trust for Mobile User-generated Content: Applications, Challenges and Implementations", HotMobile '08: Proceedings of the 9th workshop on Mobile computing systems and applications, Napa Valley, CA, Feb. 25-26, 2008, pp. 60-64.
K. Charlton, N. Taylor, "Online Credit Card Fraud against Small Businesses", Australian Institute of Criminology, Research and Public Policy Series, No. 60; pp. 14-20. https://www.aic.gov.au/publications/rpp/rpp60.
D. Denning, P. Macdoran: "Location-based authentication: grounding cyberspace for better security", Computer Fraud and Security, Oxford, GB, (19960201) XP-002117683 https://www.sciencedirect.com/science/article/abs/pii/S1361372397826139?via%3Dihub.
H. Takamizawa and N. Tanaka: International Journal of Computer Theory and Engineering vol. 4, No. 2, Apr. 2012: "Authentication System Using Location Information on iPad or Smartphone." http://www.ijcte.org/papers/441-A075.pdf.
T. Sweeney; "SIS Taps Mobiles to Reduce Credit Fraud"; Mar. 5, 2008 05:09 PM; paragraphs 1 2 and 3 https://www.informationweek.com/sis-taps-mobiles-to-reduce-credit-fraud/d/d-id/1065356?
Newbury Networks WiFi Workplace http://www.newburynetworks.com/downloads/WiFiWorkpl%D7ace.pdf via archive.com Jun. 19, 2004: Enterprise WLAN Management & Security 2004; pp. 3, 4.
Newbury Networks WiFi Workplace http://www.newburynetworks.com/downloads/WifiWatchDog_DataSh%D7eet.PDF via archive.com Jun. 18, 2004: "WiFiWatchdog TM": pp. 2,3.
T. Mundt: "Two Methods of Authenticated Positioning." Oct. 2, 2006; University of Rostock Institute of Computer Science. pp. 1, 3, 4.
B. Schilit, et al. "Ubiquitous Location-Aware Computing and the "Place Lab" Initiative." Sep. 19, 2003. p. 2.
S. Stuvel: "Sadako—Securing a building using IEEE 802.11" Jun. 16, 2006; Universiteit van Amsterdam; p. 7.
CYOTA.com via Archive.org: Cyota Esphinx 2006; http://www.cyota.com/product_7.asp; http://www.cyota.com/product_7_19 asp; http://www.cyota.com/product_11_26.asp; http://www.cyota.com/product_11_25.asp.
D. Acharya, N. Prabhu, and V. Kumar: "Discovering and Using Web Services in M-Commerce" 2005; SCE, Computer Networking, University of Missouri-Kansas City. Springer-Verlag Berlin Heidelberg 2005. pp. 13-14.
J. Hall: "Detection of Rogue Devices in Wireless Networks." Aug. 2006; Ottawa-Carleton Institute for Computer Science, School of Computer Science, Carleton University Ottawa, Ontario; Abstract, pp. 10, 91, 92, 98-100, 143, 203, 205, 208.
J. Bardram, R. Kjær, and M. Pedersen: "Context-Aware User Authentication—Supporting Proximity-Based Login in Pervasive Computing" 2003; Springer-Verlag Berlin Heidelberg 2003; Department of Computer Science, University of Aarhus. pp. 111-113, 119.
F. Adelstein, P. Alla, R. Joyce and G. Richard III: "Physically Locating Wireless Intruders" 2005; Journal of Universal Computer Science, vol. 11, No. 1 (2005); pp. 3, 4, 5, 6, 14.
THECYBERANGEL.com via Archive.org http://www.thecyberangel.com/pdfs/CyberAngelWhitePaper.pdf: CyberAngel Security Software White Paper. Feb. 17, 2006; pp. 5, 7, 17,18, 31.
K. Nishiki and E. Tanaka: "Authentication and Access Control Agent Framework for Context-Aware Services." 2005; Systems Development Laboratory, Hitachi, Ltd. Computer Society. pp. 1-4.
Business Wire: "Newbury Networks Introduces RF Firewall for Location-Based Access Control and Policy Enforcement": May 21, 2007; Las Vegas. pp. 1-2.
W, Jansen S. Gavrila and V. Korolev: "Proximity Beacons and Mobile Device Authentication: An Overview and Implementation." Jun. 2005; National Institution of Standards and Technology. US Department of Commerce. Abstract, pp. 1-2, 7, 19.
PR Newswire "Interlink Networks and Bluesoft Partner to Deliver Wi-Fi Location-Based Security Solutions" Apr. 24, 2003. PRNewswire Ann Arbor, Mich. and San Mateo, Calif. p. 1.
P. Van Oorschot, S. Stubblebine: "Countering Identity Theft through Digital Uniqueness, Location Cross-Checking, and Funneling" Feb. 28-Mar. 3, 2005 Financial Cryptography and Data Security 9th International Conference, FC 2005 Roseau, The Commonwealth of Dominica. pp. 3, 6, 7, 11-13.
S. Bhavsar: "Wireless Application Environments and Location-Aware Push Services" Dec. 2005; University of New Brunswick. pp. 119, 123, 138-142, 150, 152, 153.
S. Koo, Catherine Rosenberg, Hoi-Ho Chan, and Yat Chung Lee: "Location-based E-campus Web Services: From Design to Deployment" 2003. School of Electrical and Computer Engineering and Center for Wireless Systems and Applications, Purdue University, West Lafayette, IN 47907-1285, pp. 4, 5, 7.
MAXMIND.com via Archive.org http://www.maxmind.com/app/news_20060130 "Skyhook Wireless and MaxMind Announce Partnership" Boston, MA, Jan. 30, 2006. p. 1.
MAXMIND.com via Archive.org https://www.maxmind.com/MaxMind_minFraud_Overview.pdf: Maxmind MinFraud. Jan. 8, 2007. pp. 1-2.

(56) References Cited

OTHER PUBLICATIONS

THECYBERANGEL.com via Archive.org http://www.thecyberangel.com/pr/TheCA_SkyhookPart.pdf. Jun. 20, 2005 Nashville, TN and Boston, MA. "CyberAngel Security Solutions and Skyhook Wireless Announce Groundbreaking New Laptop Recovery System" pp. 1-2.

RSA Security via Archive.org http://www.rsasecurity.com/solutions/consumer_authentication/ADAPT_SB_0106.pdf "RSA® Adaptive Authentication the Logical Consumer Solution" p. 2. Mar. 14, 2006.

* cited by examiner

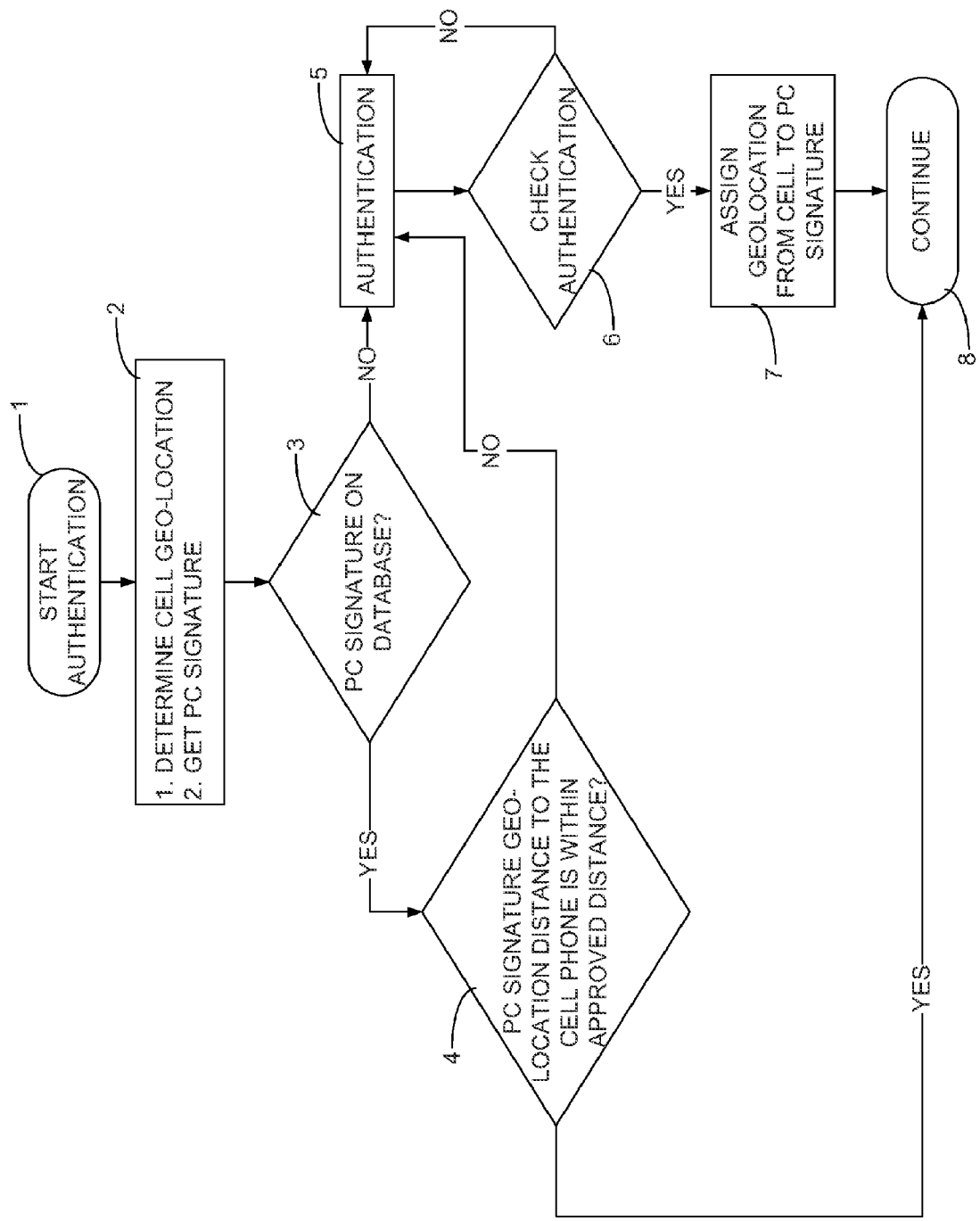

METHOD FOR INTERNET USER AUTHENTICATION

CROSS-REFERENCE TO RELATED APPLICATIONS

This application is a continuation in part of U.S. patent application Ser. No. 16/724,361, filed Dec. 22, 2019, which is a continuation-in-part of U.S. patent application Ser. No. 15/787,805, filed Oct. 19, 2017, now U.S. Pat. No. 10,521,786, which is a continuation-in-part of U.S. patent application Ser. No. 15/606,270, filed May 26, 2017, now U.S. Pat. No. 10,289,833, which is a continuation-in-part of U.S. patent application Ser. No. 15/134,545, filed Apr. 21, 2016, now U.S. Pat. No. 9,727,867, which is a continuation-in-part of U.S. patent application Ser. No. 14/835,707, filed Aug. 25, 2015, now U.S. Pat. No. 9,391,985, which is a continuation-in-part of U.S. patent application Ser. No. 14/479,266, filed Sep. 5, 2014 and now abandoned, which is a continuation-in-part of U.S. patent application Ser. No. 14/145,862, filed Dec. 31, 2013, now U.S. Pat. No. 9,033,225, which is a continuation-in-part of U.S. patent application Ser. No. 13/479,235, filed May 23, 2012, now U.S. Pat. No. 8,770,477, which is a continuation-in-part of U.S. application Ser. No. 13/065,691, filed Mar. 28, 2011, now U.S. Pat. No. 8,640,197, which is a continuation-in-part of U.S. patent application Ser. No. 12/600,808, filed on May 29, 2007, now U.S. Pat. No. 8,370,909, which is the 371 national stage in the U.S. of international patent application No. PCT/US2007/012552, filed May 29, 2007.

Priority is claimed to all of the above-identified applications, all of which are incorporated herein by reference in their entireties.

TECHNICAL FIELD

This invention relates to Internet user identification. More specifically it relates to using computer characteristics to identify an internet user. Even more specifically it relates to using characteristics of the user's computer and a cell phone location to identify the user.

BACKGROUND

The invention relates to a method and system for authenticating Internet user identity, and more particularly, to a method and system for authenticating internet user identity by cross-referencing the geographical location of a internet user's Communication voice device, such as a mobile voice device, a Voice over Internet Protocol (hereinafter VoIP) telephone or non-mobile telephone, and the geographical location of the computer signature.

Computer signature can be set of one or more hardware devices information, unlimited example the gateway Mac address, the computer Mac address, CPU serial number and more. The computer signature can also be set of one or more software components. Unlimited example—the operating system serial number, cookie, combination of few software's versions etc., hereinafter (computer signature)

The use of the internet has become a common a popular arena for the sale of goods and services. Such sales require the transmission of personal and confidential data belonging to the buyer of such goods and services. Such information is often the target of identity theft. In response to the increase in the opportunity for the commission of fraud through identity theft, sellers and providers of goods and services through the internet require a method whereby such fraud can be reduced.

With respect to internet usage, upon accessing the internet, an internet user's computer is identified with an IP address, it should be understood that Internet Protocol Address (hereinafter "IP Address") means any internet communication protocol such as but not limited to IPV4 and IPV6. And whenever the internet user enters a website, the internet user's IP address is identified to the website owner. Such identified IP addresses can be traceable geographically to its source so as to determine the location (state and city) of the internet user, in some cases the IP address can be traced to a radius of a few miles from its source. The comparison of the geographical location of the internet user computer signature, with the geographical location of said internet user Communication voice device can provide the seller or provider a means to authenticate the identify of the Internet user.

United States Pat. App. Pub. No. 2001/0034718 A1 to Shaked et al. discloses a method of controlling access to a service over a network, including the steps of automatically identifying a service user and acquiring user information, thereby to control access. Additionally, a method of providing service over a network, in which the service requires identification of a user, including the steps of automatically identifying the user and associating the user with user information, thus enabling the service, is disclosed.

U.S. Pat. No. 6,466,779 to Moles et al. discloses a security apparatus for use in a wireless network including base stations communicating with mobile stations for preventing unprovisioned mobile stations from accessing an internet protocol (IP) data network via the wireless network.

United States Pat. App. Pub. No. 2002/0188712 A1 to Caslin et al. discloses a fraud monitoring system for a communications system. The fraud monitoring system analyzes records of usage activity in the system and applies fraud pattern detection algorithms to detect patterns indicative of fraud. The fraud monitoring system accommodates both transaction records resulting from control of a packet-switched network and those from a circuit-switched network gateway.

United States Pat. App. Pub. No. 2003/0056096 A1 to Albert et al. discloses a method to securely authenticate user credentials. The method includes encrypting a user credential with a public key at an access device. The public key is part of a public/private key pair suitable for use with encryption algorithm. The decrypted user credential is then transmitted from the decryption server to an authentication server for verification. The decryption server typically forms part of a multi-party service access environment including a plurality of access providers. This method can be used in legacy protocols, such as Point-to-Point Protocol (PPP), Password Authentication Protocol (PAP), Challenge-Handshake Authentication Protocol (CHAP), Remote Authentication Dial in User Server (RADIUS) protocol, Terminal Access Controller Access Control System (TACAS) protocol, Lightweight Directory Access Protocol (LDAP), NT Domain authentication protocol, Unix password authentication protocol, Hypertext Transfer Protocol (HTTP), Hypertext Transfer Protocol over Secure sockets layer (HTTPS), Extended Authentication Protocol (EAP), Transport Layer Security (TLS) protocol, Token Ring protocol, and/or Secure Remote Password protocol (SRP).

United States Patent Application Publication Number US 2003/0101134 A1 published to Liu et al. on May 29, 2003 teaches a method for transaction approval, including submitting a transaction approval request from a transaction site to a clearing agency; submitting a user authorization request from the clearing-agency to a user device; receiving a response to the user authorization request; and sending a response to the transaction approval request from the clearing agency to the transaction site. Another method for transaction approval includes: submitting a transaction approval request from a transaction site to a clearing agency; determining whether a trusted transaction is elected; submitting a user authorization request from the clearing agency to a user device if a trusted transaction is determined to be elected; receiving a response to the user authorization request from the user device if the user authentication request was submitted; and sending a response to the transaction approval request from the clearing agency to the transaction site. A system for transaction approval includes a clearing agency for the transaction approval wherein the clearing agency having a function to request for user authorization, a network operatively coupled to the clearing agency, and a user device adapted to be operatively coupled to the network for trusted transaction approval.

United States Patent Application Publication Number US 2003/0187800 A1 published to Moore et al. on Oct. 2, 2003 teaches systems, methods, and program products for determining billable usage of a communications system wherein services are provided via instant communications. In some embodiments, there is provided for authorizing the fulfillment of service requests based upon information pertaining to a billable account.

United States Patent Application Publication Number US 2004/0111640 A1 published to Baum on Jun. 10, 2004 teaches methods and apparatus for determining, in a reliable manner, port, physical location, and/or device identifier, such as a MAC address, associated with a device using an IP address and for using such information, e.g., to support one or more security applications. Supported security applications include restricting access to services based on the location of a device seeking access to a service, determining the location of stolen devices, and authenticating the location of the source of a message or other IP signal, e.g., to determine if a prisoner is contacting a monitoring service from a predetermined location.

United States Patent Application Publication Number US 2005/0159173 A1 published to Dowling on Jul. 21, 2005 teaches methods, apparatus, and business techniques for use in mobile network communication systems. A mobile unit, such as a smart phone, is preferably equipped with a wireless local area network connection and a wireless wide area network connection. The local area network connection is used to establish a position-dependent, e-commerce network connection with a wireless peripheral supplied by a vendor. The mobile unit is then temporarily augmented with the added peripheral services supplied by the negotiated wireless peripheral. Systems and methods allow the mobile unit to communicate securely with a remote server, even when the negotiated wireless peripheral is not fully trusted. Also included are mobile units, wireless user peripherals, and negotiated wireless peripherals projecting a non-area constrained user interface image on a display surface.

United States Patent Application Publication Number US 2005/0160280 A1 published to Caslin et al. on Jul. 21, 2005 teaches providing fraud detection in support of data communication services. A usage pattern associated with a particular account for remote access to a data network is monitored. The usage pattern is compared with a reference pattern specified for the account. A fraud alert is selectively generated based on the comparison.

United States Patent Application Publication Number US 2005/0180395 A1 published to Moore et al. on Aug. 18, 2005 teaches an approach for supporting a plurality of communication modes through universal identification. A core identifier is generated for uniquely identifying a user among a plurality of users within the communication system. One or more specific identifiers are derived based upon the core identifier. The specific identifiers serve as addressing information to the respective communication modes. The specific identifiers and the core identifier are designated as a suite of identifiers allocated to the user.

While these systems may be suitable for the particular purpose employed, or for general use, they would not be as suitable for the purposes of the present invention as disclosed hereafter.

BRIEF DESCRIPTION OF THE INVENTION

It is an object of the invention to produce a means to decrease the potential for fraud through authentication of the identity of an internet user. Accordingly, this method provides for authenticating the identity of the internet user or purchaser (hereinafter "internet user") through cross-referencing and comparison of at least two independent sources of information, such as, but not limited to, the internet user's computer signature geographical location and the geographical location of a Communication voice device associated with said internet user.

It is another object of the invention to provide a means for providing an accurate geographical location of the Internet user and the internet user's computer signature.

It is another object of the invention to provide a convenient means for determining the location of internet users at both mobile and non-mobile Communication voice devices and terminals. Accordingly, this method includes the utilization systems and software that are used to locate the geographical location of people or Communication voice devices, such as, but not limited to Global Positioning Systems (GPS), Galileo, WiMax, Wi-Fi, RFID and external positioning apparatus, such as, but not limited to, cellular base stations and antennas.

It is another object of the invention to provide a convenient means for determining a more accurate geographical location of routers using the internet user Communication voice device's geographical location and the said user computer signature.

This invention is a method and system for authenticating an internet user identity by cross-referencing and comparing at least two independent sources of information. A first computer signature of an internet user is identified. The geographical address of a communications device of said internet user is traced to determine a second location. The first and second locations are compared for geographical proximity to confirm the identity of the internet user. Additionally, depending on the geographical proximity of the first and second location, a positive or negative score may be assigned to the internet user, and access to the website and the ability to conduct transactions may be allowed or limited based on the assigned score. Alternatively, additional authentication information may be required of the internet user in order to proceed with the online transaction, or access by the internet user may be terminated.

A computer signature is created by identifying certain characteristics of the computer. These characteristics act as identifiers of the computer. Every computer that is connected to the Internet has few unique identifiers such as but not limited to: Computer Network Mac address, CPU serial number, Operating System S/N. and more. In addition to the above the computer uses other network resources that have unique identifiers such as but not limited to a Gateway or Router Mac Address. In addition to the above every computer has common identifiers such as but not limited to: Operating system version, Disk Size, Internet browser version, hardware installed on the computer, network card speed, Operating system patches installed on the computer, CPU speed, memory size, cookie, secret cookie, virtual memory size, other installed software on the computer and more. Using one or more then one common identifiers together it is possible to create one unique computer signature for any given computer.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 1 is a flow chart of the method and system of the present invention.

BEST MODE FOR CARRYING OUT THE INVENTION

This invention relates to a method and system for authenticating Internet user identity by cross-referencing or comparing at least two independent sources of information, identifying at least two geographical locations. Based upon geographical proximity of said locations, a score is assigned to the internet user, and predetermined access to a website and an ability to conduct transactions is allowed or limited based upon said score. Alternatively, additional authentication information can be required or access can be terminated. The invention is also a convenient means for determining a more accurate geographical location of routers.

FIG. 1 illustrates a method for authenticating internet user identity by cross-referencing and comparing at least two independent sources of information. In step 1, an internet user starts authentication. Then, in step 2, the online entity locates the geographic location of the Internet user's cell phone and checks the user's computer signature. In step 3, the online entity looks for the computer signature in a database. If the computer signature is discovered, the method proceeds to step 4. In step 4, the online entity compares the distance between the geographic location of the computer defined by the computer signature and the geographic location of the user's cell phone. If the distance is acceptable, the authentication process continues at step 8. If the distance is not acceptable, the method goes to step 5.

If the computer signature is not in the database, the method also continues to step 5. In step 5, the online entity attempts to authenticate the computer by other means. In step 6, the authentication is confirmed. If the authentication is acceptable, the method continues to step 7. If the authentication is not acceptable, the method returns to step 5 and repeats step 5.

If the authentication is acceptable, continues to step 7 assigning the geographic location of the user's cell phone to the computer signature and saving it in the database. The method then continues with the authentication in step 8.

Referring to FIG. 1, the method starts when the online entity decides to authenticate the internet user accessing a website and provides information, as in steps 1 and 2. The website vendor then decides to authenticate internet user identity, based on the information provided by the internet user, as shown in step 3. What information will trigger the decision to authenticate the identity of the internet user will vary among vendors employing the method described herein. For purposes of clarity, the term vendor will be used hereafter and it should be understood that vendor means any business, organization or commercial entity which conducts on-line commercial transactions through a website on the internet, such as, but not limited to, banking institutions, on-line stores or other commercial or none commercial entities.

Upon accessing a website, in step 2, the computer signature will be identified. The invention is not limited to a conventional computer, but may include terminals, smart phones (PDA's) or other devices capable of communicating with the internet. Whenever the internet user enters a website, the internet user's computer signature is identified for a website owner.

A computer signature is created by identifying certain characteristics of the computer. These characteristics act as identifiers of the computer. Every computer that connected to the Internet has few unique identifiers. Using one, or more then one, common identifiers together it is possible to create one unique computer signature. These identifiers are selected from the list of Computer Network Mac address, CPU serial number, Operating System S/N. and more. In addition to the above the computer uses other network resources that have unique identifiers such as but not limited to a Gateway or Router Mac Address. In addition to the above every computer has common identifiers such as but not limited to: Operating system version, Disk Size, Internet browser version, hardware installed on the computer, network card speed, Operating system patches installed on the computer, CPU speed, memory size, virtual memory size, other installed software on the computer and more. A person skilled in the art will see that other computer characteristics could be used as identifiers to create a computer signature.

The vendor will then request from the internet user a contact number for a communications voice device, which is accessible to the internet user at the internet user's current location. Communication voice device, as used in the context of the present invention, applies to any voice device capable of communicating with another voice device such as, but not limited to, phone, mobile voice device, VoIP telephone or personal digital assistant (hereinafter PDA). Other non-limiting examples include any device that has been modified or designed for voice or text communication. A geographical location for the communication voice device is then traced, as stated in step 2.

It should be understood that the term "mobile voice device", as used in the context of the present invention, applies to any mobile device modified or designed for voice or text communication and capable of communicating with another device via wireless network such as but not limited to cellular system, radio system, Wi-Fi, WiMax, RFID, Bluetooth (short wavelength radio transmissions), MIMO, UWB (Ultra Wide Band), satellite system or any other such wireless networks known now or in the future.

Other non-limiting examples include any device that has been modified or designed to communicate with a web-ready PDA, a Blackberry, a laptop computer with cellular connect capability, or a notification server, such as email server:

The geographical location of a telephone can be traced using any one of existing databases. As a non-mobile telephone is attached to a single physical location, the location is available using various existing databases. A Voice over Internet Protocol (hereinafter VoIP) telephone is connected to high-speed internet access such as Ti, DSL, cable modems, or other available internet connection systems. A VoIP location is available using various databases. A VoIP connection provider company can provide the IP address to which such VoIP telephone is connected such that the geographical location of the internet user is traceable to the IP address.

The geographical location of a mobile voice device can be traced using technology such as, but not limited to, Galileo, GPS, cellular antenna network, phone antenna, Wi-Fi, Bluetooth (short wavelength radio transmissions), MIMO, UWB, WiMax, etc.

A cellular telephone location system for automatically recording the location of one or more mobile cellular telephones is described, for example, in U.S. Pat. No. 5,327,144. The system comprises a central site system operatively coupled to at least three cell sites. Each of the cell sites receives cellular telephone signals and integrates a timing signal common to all the cell sites. The central site calculates differences in times of arrival of the cellular telephone signals arriving among the cell sites and thereby calculates the position of the cellular telephone producing the cellular telephone signals. Additional examples of known methods for locating phones are cell sector and cell site.

The position of an internet user's mobile voice device can be determined by, for example: (a) an internal positioning apparatus such as a Global Positioning System (hereinafter GPS) receiver built into the mobile voice device that receives GPS radio signals transmitted from GPS satellites; and (b) an external positioning apparatus such as a cellular positioning system that computes the position of the mobile voice device by observing time differences among the arrivals of a radio signal transmitted by the mobile voice device at a plurality of observation points, i.e., base stations. The operation of the GPS is well-known and will not be described further herein.

Next, the geographical location of the IP address of the internet user is traced, as stated in step 2. Such an IP address can be traced geographically to its source so as to determine the location (state and city) of the internet user. In some cases the system used to trace the IP address can be so accurate that it can identify a street and house number of the internet user.

Another means for obtaining the geographical location of the internet user's computer signature, the internet user's ISP can be contacted to request a full address from where the internet user is connected. For example, a modem dial-up internet user is assigned a unique computer signature by their ISP. After the internet user enters a username and password the ISP knows from which phone number that internet user called and can trace a contacting number to a geographical location.

The present invention includes a method of locating a router's geographical location based on the computer signature geographical location. In addition, the invention includes a method of geographically comparing the user communication voice device and the computer signature. All of the methods may utilize a communication voice device that is either non-mobile telephone, a mobile telephone or a mobile voice device.

Since the following is known:
1. The geographical location of the user's computer signature.
2. The routing table between the vendor internet web site and the internet user.

Then, the vendor can locate the geographical location of the closest public router to the internet user computer signature. Since the first public router that the internet user is using is close geographically to the internet user computer signature.

It is to be understood that the present invention is not limited to the embodiments described above, but encompasses any and all embodiments under the doctrine of equivalents.

In conclusion, herein is presented a method and system for authenticating internet user identity. The invention is illustrated by example in the drawing FIGURES, and throughout the written description. It should be understood that numerous variations are possible, while adhering to the inventive concept. Such variations are contemplated as being a part of the present invention.

INDUSTRIAL APPLICABILITY

This invention can be used for any purpose that is related to internet security, internet commerce and internet user identification. The invention is specifically envisioned as an improvement over existing log-in methods and purchases identification methods, but a person skilled in the art will recognize other applications.

I claim:
1. A computer system configured to authenticate the identity of a user who is attempting to access the system or conduct a transaction, the user being associated with a computer signature and being in possession of a mobile phone, the computer system being configured to perform the following steps:
   (A) obtain the geographical location of the mobile phone;
   (B) determine if the computer signature associated with the user is associated in a database with a stored geographical location;
   (C) if the computer signature is associated in the database with the stored geographical location, comparing the stored geographical location to the geographical location of the mobile phone obtained at step (A) and proceeding to step (E);
   (D) if the computer signature is not associated in the database with a stored geographical location, then attempting to authenticate the identity of the user by requiring the user to provide additional authentication information, and only if the identity of the user is authenticated by the additional authentication information, storing, in the database, the computer signature in association with the mobile phone geographical location obtained at step (A), and carrying out at least one of the following actions:
      (1) allowing the user access and/or the ability to conduct transactions, and (11) assigning to the user a positive score;
   (E) if step (C) has been taken, and the result of the comparison is a difference in location that is within an acceptable distance, carrying out one or more of the following actions:
      (1) allowing the user access and/or the ability to conduct transactions; and (11) assigning to the user a positive score;

(F) if the result of the comparison is a difference in location that is not within the acceptable distance, then attempting to authenticate the identity of the user by other means, wherein the computer signature comprises at least one software identifier, wherein the geographical location of the mobile phone is identified by at least one method selected from the group consisting of Galileo, GPS, cellular antenna network, phone antenna, WiFi, Bluetooth, MIMO, UWB, and WiMax.

2. The computer system of claim 1, wherein the computer signature is a signature of the mobile phone.

3. The computer system of claim 1, wherein the computer signature comprises a signature of a device other than the mobile phone.

4. The computer system of claim 1, being further configured to perform the following steps:
(G) if the identity of the user is authenticated by said other means at step (F), carrying out one or more of the following actions: (i) allowing the user access and/or the ability to conduct transactions; (ii) assigning to the user a positive score; and (iii) storing, in the database, the computer signature in association with the obtained mobile phone geographical location;
(H) if the identity of the user is not authenticated by said other means at step (F) or step (D), carrying out one or more of the following actions:
(i) limiting the ability of the user to conduct transactions;
(ii) requesting more authentication information from the user; and
(iii) terminating access of the user.

5. A computer system configured to authenticate the identity of a user who is attempting to access the system and/or conduct a transaction, the user being associated with a computer signature and being in possession of a mobile phone, the computer system being configured to perform the following steps:
(A) obtaining the geographical location of the mobile phone;
(B) determining if the computer signature associated with the user is associated in a database with a stored geographical location;
(C) if the computer signature is associated in the database with the stored geographical location, comparing the stored geographical location to the geographical location of the mobile phone obtained at step (A) and proceeding to step (E);
(D) if the computer signature is not associated in the database with a stored geographical location, then attempting to authenticate the identity of the user by requiring the user to provide additional authentication information, and only if the identity of the user is authenticated by the additional authentication information, storing, in the database, the computer signature in association with the obtained mobile phone geographical location obtained at step (A), and carrying out at least one of the following actions:
(i) allowing the user access and/or the ability to conduct transactions, and (ii) assigning to the user a positive score;
(E) if step (C) has been taken, and the result of the comparison at step (C) is a difference in location that is within an acceptable distance, carrying out one or more of the following actions: (i) allowing the user access and/or the ability to conduct transactions; and (ii) assigning to the user a positive score;
wherein the computer signature comprises at least one software identifier, wherein the geographical location of the mobile phone is identified by at least one method selected from the group consisting of Galileo, GPS, cellular antenna network, phone antenna, WiFi, Bluetooth, MIMO, UWB, and WiMax.

6. The computer system of claim 5, further configured to carry out one or more of the following actions if the identity of the user is not authenticated by the additional authentication information:
(i) limiting the ability of the user to conduct transactions;
(ii) requesting more authentication information from the user; and (ii) terminating access of the user.

7. The computer system of claim 6, wherein the computer signature comprises at least one identifier of a router.

8. The computer system of claim 6, wherein the computer signature comprises a signature of a device other than the mobile phone.

9. The computer system of claim 5, further configured to attempt to authenticate the identity of the user by the additional authentication information if the result of the comparison at step (C) is a difference in location that is not within an acceptable distance.

10. The computer system of claim 9, wherein the computer signature comprises at least one identifier selected from the group consisting of a cookie, a computer name, an identifier of the user's browser, an identifier of the operating system, and an identifier of a router.

11. The computer system of claim 10, further configured to carry out one or more of the following actions if the identity of the user is not authenticated by the additional authentication information:
(i) limiting the ability of the user to conduct transactions;
(ii) requesting more authentication information from the user; and (iii) terminating access of the user.

12. The computer system of claim 11, wherein the computer signature is a signature of the mobile phone.

13. The computer system of claim 9, further configured to carry out one or more of the following actions if the identity of the user is authenticated by said other means:
(i) allowing the user access and/or the ability to conduct transactions;
(ii) assigning to the user a positive score; and
(iii) storing, in the database, the computer signature in association with the obtained mobile phone geographical location.

14. The computer system of claim 10, wherein the computer signature is a signature of the mobile phone.

15. The computer system of claim 11, wherein the computer signature comprises a signature of a device other than the mobile phone.

16. The computer system of claim 11, wherein the computer signature comprises at least one identifier of a router.

17. The computer system of claim 6, wherein the computer signature is a signature of the mobile phone.

18. The computer system of claim 5, wherein the computer signature comprises at least one identifier of a router.

* * * * *

UNITED STATES PATENT AND TRADEMARK OFFICE
CERTIFICATE OF CORRECTION

PATENT NO. : 11,354,667 B2
APPLICATION NO. : 17/149776
DATED : June 7, 2022
INVENTOR(S) : Hefetz It is certified that error appears in the above-identified patent and that said Letters Patent is hereby corrected as shown below:

In the Claims

Claim 4 should read:
4. The computer system of claim 1, being further configured to perform the following steps:
(G) if the identity of the user is authenticated by said additional authentication information at step (F), carrying out one or more of the following actions:
    (i) allowing the user access and/or the ability to conduct transactions;
    (ii) assigning to the user a positive score; and
    (iii) storing, in the database, the computer signature in association with the obtained mobile phone geographical location;
(H) if the identity of the user is not authenticated by said other means at step (F) or step (D), carrying out one or more of the following actions:
    (i) limiting the ability of tire user to conduct transactions;
    (ii) requesting more authentication information from the user; and
    (iii) terminating access of the user.

Claim 5 should read:
5. A computer system configured to authenticate the identity of a user who is attempting to access the system and/or conduct a transaction, the user being associated with a computer signature and being in possession of a mobile phone, the computer system being configured to perform the following steps:
(A) obtaining tile geographical location of fee mobile phone;
(B) determining if the computer signature associated with the user is associated in a database with a stored geographical location;
(C) if the computer signature is associated in the database with the stored geographical location, comparing the stored geographical location to the geographical location of the mobile phone obtained at step (A) and proceeding to step (E);
(D) if the computer signature is not associated in the database with a stored geographical location, then attempting to authenticate the identity of the user by requiring the user to provide additional authentication information, and only if the identity of the user is authenticated by the additional authentication information, storing, in the database, the computer signature in association with the Signed and Sealed this
Eleventh Day of October, 2022

*Katherine Kelly Vidal*

Katherine Kelly Vidal
*Director of the United States Patent and Trademark Office* mobile phone geographical location obtained at step (A), and carrying out at least one of the following actions:
    (i) allowing the user access and/or the ability to conduct transactions, and
    (ii) assigning to the user a positive score;
(E) if step (C) has been taken, and the result of the comparison at step (C) is a difference in location that is within an acceptable distance, carrying out one or more of the following actions:
    (i) allowing the user access and/or the ability to conduct transactions; and
    (ii) assigning to the user a positive score;
wherein the computer signature comprises at least one software identifier, wherein the geographical location of the mobile phone is identified by at least one method selected from the group consisting of Galileo, GPS, cellular antenna network, phone antenna, WiFi, Bluetooth, MIMO, UWB, and WiMax.

Claim 13 should read:
13. The computer system of claim 9, further configured to carry out one or more of the following actions if the identity of the user is authenticated by said additional authentication information:
    (i) allowing the user access and/or the ability to conduct transactions;
    (ii) assigning to the user a positive score; and
    (iii) storing, in the database, the computer signature in association with the obtained mobile phone geographical location.